United States Patent
Jost et al.

(10) Patent No.: US 11,370,415 B2
(45) Date of Patent: Jun. 28, 2022

(54) SYSTEMS AND METHODS FOR ADAPTIVE USER INPUT BOUNDARY SUPPORT FOR REMOTE VEHICLE MOTION COMMANDS

(71) Applicant: Ford Global Technologies, LLC, Dearborn, MI (US)

(72) Inventors: Gabrielle Jost, Niederzier (DE); Ali Hassani, Ann Arbor, MI (US); Erick Michael Lavoie, Van Buren Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 375 days.

(21) Appl. No.: 16/694,401

(22) Filed: Nov. 25, 2019

(65) Prior Publication Data

US 2021/0155229 A1    May 27, 2021

(51) Int. Cl.
| | |
|---|---|
| *B60W 30/06* | (2006.01) |
| *B62D 15/02* | (2006.01) |
| *G05D 1/00* | (2006.01) |
| *G06F 3/0354* | (2013.01) |
| *G06F 3/04883* | (2022.01) |
| *B60W 50/00* | (2006.01) |

(52) U.S. Cl.
CPC ......... *B60W 30/06* (2013.01); *B62D 15/0285* (2013.01); *G05D 1/0016* (2013.01); *G06F 3/03547* (2013.01); *G06F 3/04883* (2013.01); *B60W 2050/0002* (2013.01); *G05D 2201/0213* (2013.01)

(58) Field of Classification Search
CPC .................................................. B60W 30/06
See application file for complete search history.

(56) References Cited

U.S. PATENT DOCUMENTS

| | | | |
|---|---|---|---|
| 8,760,417 B2 | 6/2014 | Haug | |
| 9,052,761 B2 * | 6/2015 | Zhou | ............... G06F 3/0488 |
| 9,129,528 B2 | 9/2015 | Lavoie et al. | |
| 9,361,009 B2 * | 6/2016 | Munter | ............... G06F 3/04847 |
| 9,377,859 B2 | 6/2016 | Clarkson | |
| 9,395,905 B2 * | 7/2016 | Wherry | ............... G06F 3/04883 |
| 9,971,442 B2 * | 5/2018 | Heim | ............... G06F 3/0416 |
| 10,684,773 B2 * | 6/2020 | Lavoie | ............... G06F 3/017 |
| 10,884,592 B2 * | 1/2021 | Everitt | ............... G06F 3/04845 |
| 11,112,786 B2 * | 9/2021 | Golgiri | ............... B62D 15/0285 |
| 2013/0109272 A1 | 5/2013 | Rindlisbacher | |
| 2013/0120298 A1 | 5/2013 | Zhou | |
| 2016/0088060 A1 * | 3/2016 | Rahman | ............... G06F 3/04883 |
| | | | 715/740 |
| 2021/0155229 A1 * | 5/2021 | Jost | ............... G05D 1/0016 |

FOREIGN PATENT DOCUMENTS

| | | |
|---|---|---|
| WO | 2016048731 A1 | 3/2016 |
| WO | 2016066717 A1 | 5/2016 |

* cited by examiner

*Primary Examiner* — Michael A Berns
(74) *Attorney, Agent, or Firm* — Frank Lollo; Eversheds Sutherland (US) LLP

(57) ABSTRACT

Systems and methods are provided herein for adaptive user input boundary support for remote vehicle motion commands. The systems and methods described herein may be used to allow more flexibility in continuous inputs provided to trigger commands to a vehicle to perform an autonomous function, such as Remote Park Assist (RePA). The systems and methods may allow RePA to continue even if the continuous input is not provided in the form of a perfect circle or if the continuous input drifts gradually over time.

20 Claims, 7 Drawing Sheets

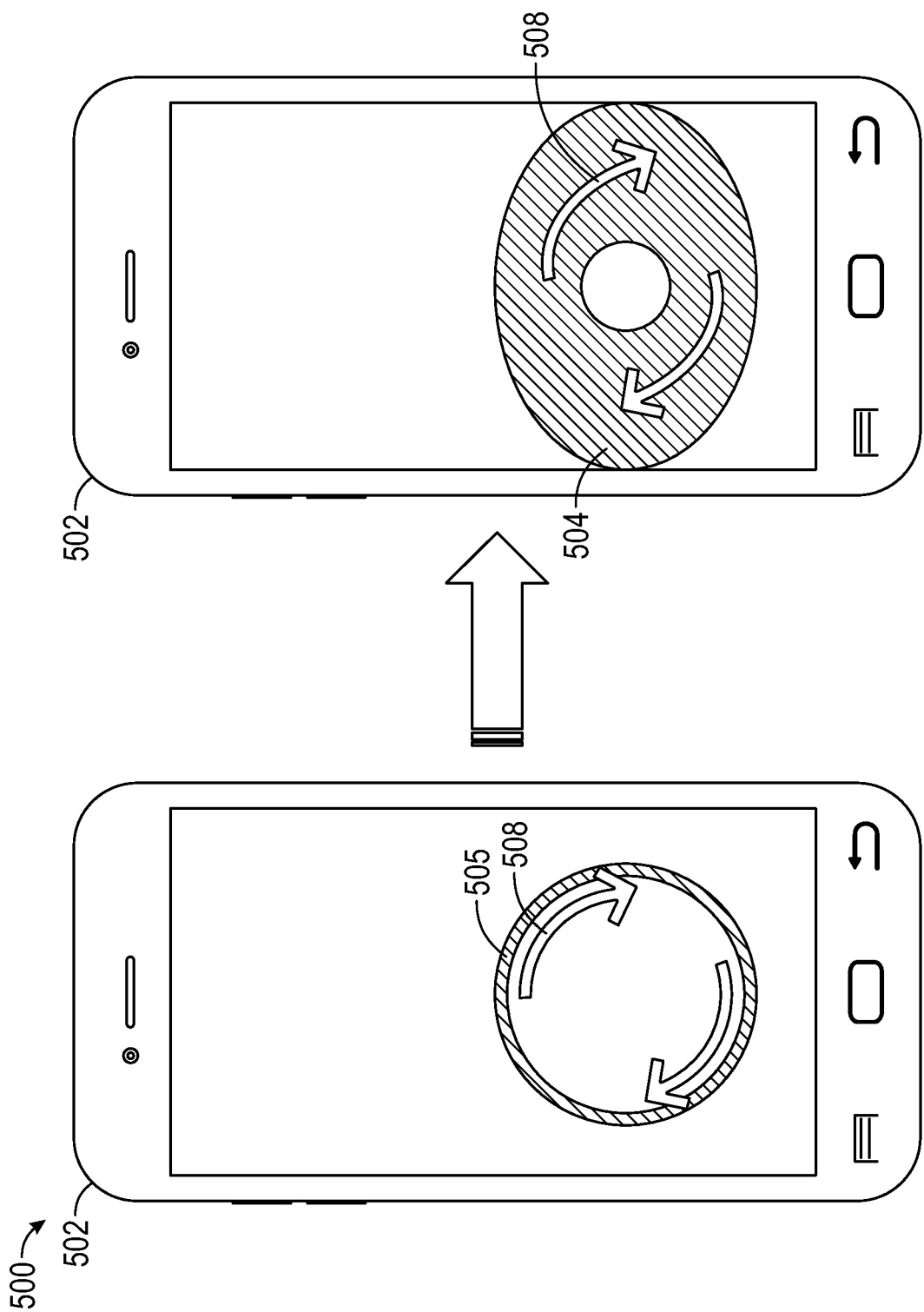

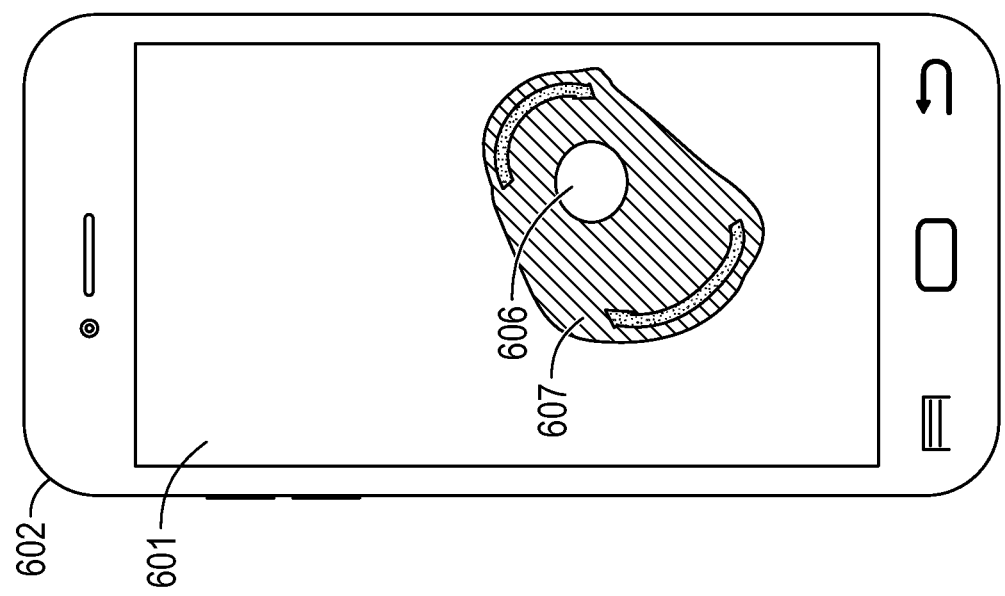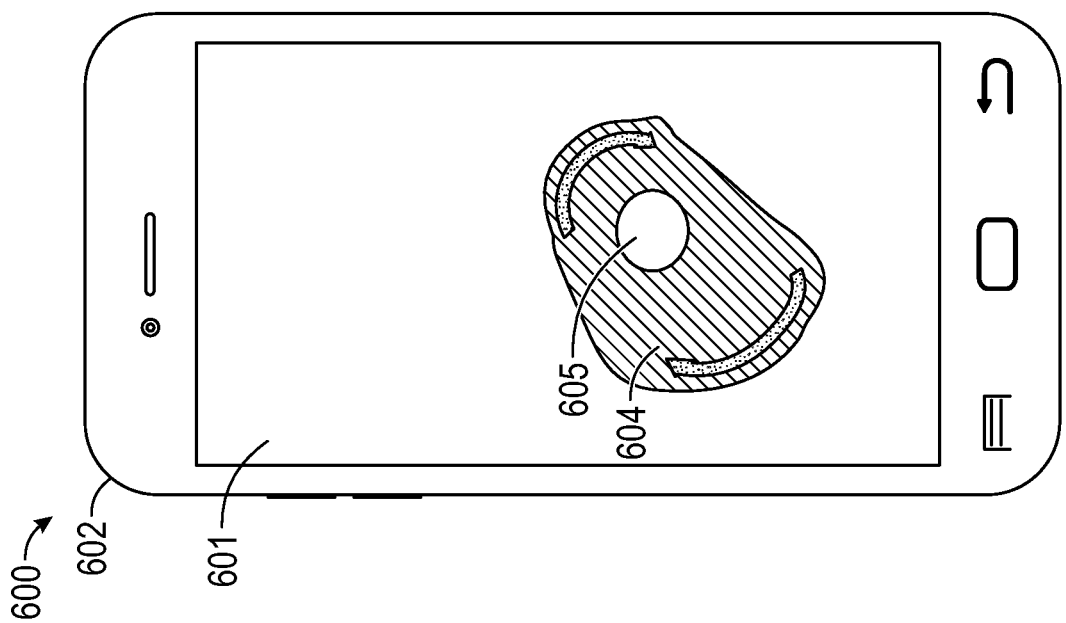
FIG. 6

SYSTEMS AND METHODS FOR ADAPTIVE USER INPUT BOUNDARY SUPPORT FOR REMOTE VEHICLE MOTION COMMANDS

TECHNICAL FIELD

The present disclosure generally relates to systems and methods for adaptive user input boundary support for remote vehicle motion commands and more particularly relates to Level 2 autonomous driving features such as Remote Park Assist (RePA) and Remote Autohitch (ReAH).

BACKGROUND

Level 2 autonomous driving features involving a vehicle driving along a planned path, such as Remote Park Assist (RePA) and Remote Autohitch (ReAH), may use a remote continuous input system to convey a user's intent to park the vehicle (for example). To verify that the input is intentional and not caused by a mobile malfunction or unintentional input, rather complex dynamic input shapes may be used that cannot easily to be mimicked by a fault in the system. To mitigate various failure modes pertaining to phone touch matrices, for example, an orbital motion on a touchscreen may be implemented. These motions generally eliminate risk of false input detections or pixels getting stuck.

However, a simple comparison of the input coordinates with the coordinates of the expected input shape may lead to a rather non-robust detection of unintentional/invalid input. The current RePA system's continuous input tolerances of following an orbital path are too tight, so a user may intend to provide a valid input, but the system may not register the input as valid, for example, if the user's thumb becomes tired and slightly deviates from the allowed orbital path. This may result in an inadvertent detection of an invalid input. Other examples of scenarios where an input might gradually drift might include, a protective film was added over the display surface, the display becomes cracked but remains functional resulting in different finger movement to avoid split glass, a user may have a condition such as arthritis or a hand injury, users may hold the phone differently if they purchase a new phone case, the display touch performance could alter based on the outside temperature, or the user could simply get more sloppy in their inputs.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 5 illustrates a comparison between a typical circular path and a more relaxed path geometry in accordance with one or more example embodiments of the disclosure.

FIG. 6 depicts an example of a dynamic adaptation to a drift in a continuous input in accordance with one or more example embodiments of the disclosure.

DETAILED DESCRIPTION

Overview

The disclosure is directed to, among other things, systems and methods for adaptive user input boundary support for remote vehicle motion commands. In some embodiments, the systems and methods described herein may involve a more relaxed (e.g., freeform) continuous input geometry as well as the capability to dynamically adapt to a gradual change in location of a continuous motion input provided to a mobile device. Reinforcement learning may be employed to intelligently adapt a custom input path. A recommendation may be given to the user regarding where to make an initial continuous input motion, and, assuming the motion is valid, the custom input path be adjusted dynamically as the user's input drifts over time. The following descriptions of such systems and methods as disclosed herein are merely exemplary and are not confined to the embodiments described herein. For example, any descriptions may only be applicable to some embodiments. Moreover, alternative embodiments may include more or less steps than are shown or described herein.

The mobile device may be used to provide commands to a vehicle to perform certain autonomous functions based on a continuous user input (for example, the vehicle may persist with performing the autonomous function as long as the user is providing the continuous input). It may be necessary to determine that the intent of the user is to provide a command to the vehicle to perform the autonomous function, so it may be required that the input be provided in a particular manner that may not mistakenly be replicated (e.g., in a continuous circular motion). However, a user may not be able to provide a perfectly circular input for the duration of the continuous motion, so it may be necessary to adapt to a slight deviation in the input within a certain acceptable tolerance range.

The systems described herein may also operate based on a determined confidence level that the user performing the continuous input is an allowed user. The confidence level may be established based on a number of factors, such as, for example, a sign in to a user account, biometric information, a computer vision analysis of an image of the user, an audio analysis of the voice of the user, or any other feasible user verification method. Any user may be able to provide the continuous input to trigger the vehicle autonomous features.

Figure 4A:
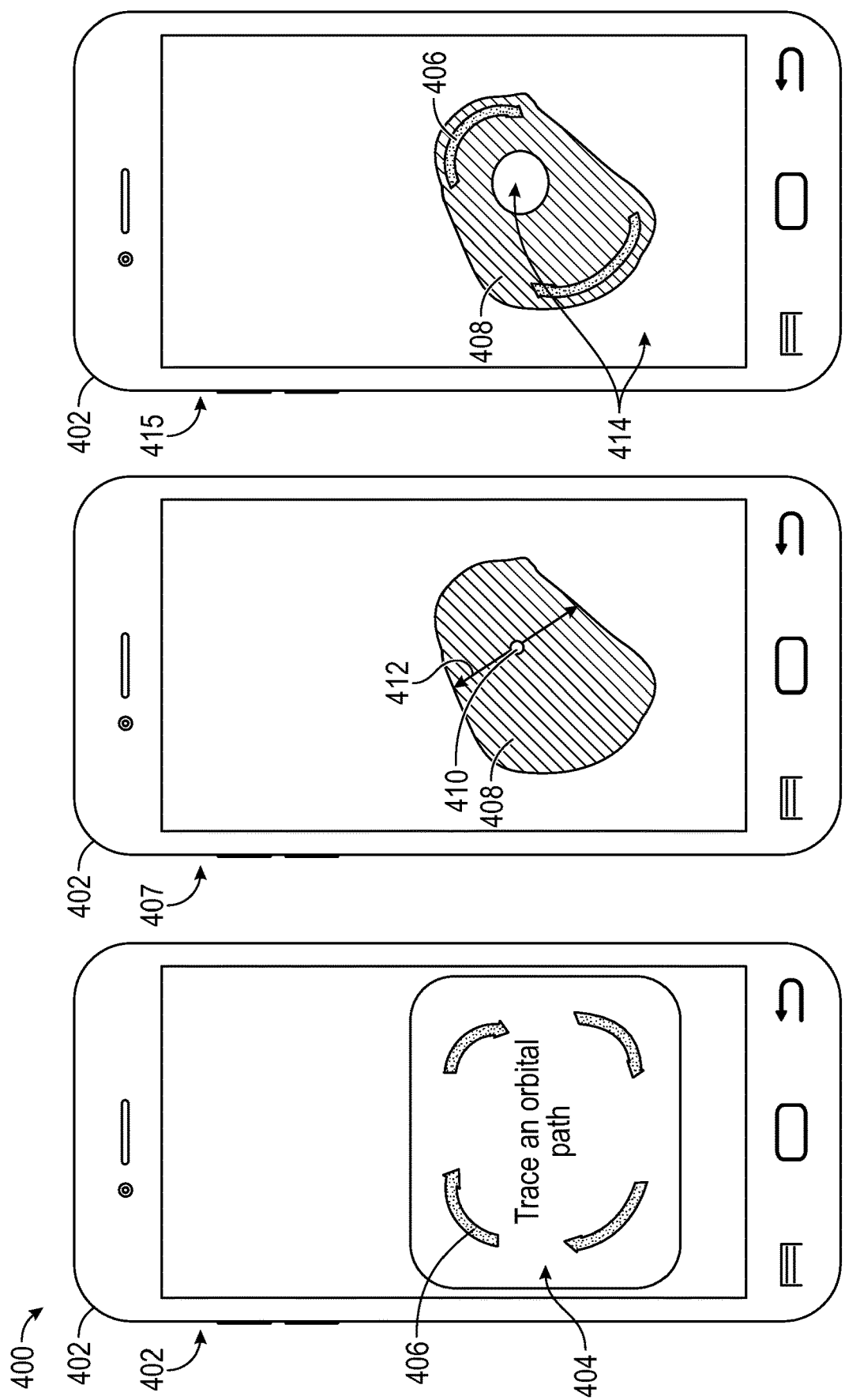
FIG. 4A depicts an example process for learning and evaluating input motions in accordance with one or more example embodiments of the disclosure.

An initial allowable orbital boundary may be determined through a learning and evaluation process. This learning and evaluation process may be a passive learning process. The initial allowable orbital boundary may represent a region of a user interface of the mobile device in which the user may perform the continuous input in order to trigger the vehicle to perform the autonomous function. The process may begin with a learning phase in which a designated area and a direction of continuous motion are indicated on the user interface of the mobile device (e.g., as depicted in FIG. 4A). The designated area may be highlighted on the user interface and arrows forming a circle or other shape and pointing in a certain direction may be provided to indicate that the user needs to provide a continuous input within the highlighted area and in the indicated direction. The user may then provide the continuous input in the designated area for a determined period of time. Once a sufficient sample of the user continuous input has been obtained, a reinforcement learning algorithm may create an allowed orbital boundary, which may represent the largest orbital path encapsulated by the user's motion while providing the sample continuous input. Depending on the manner in which the user provided the input, the allowed orbital boundary may not necessarily be in a defined shape, such as a circle, but may instead be a freeform shape.

The learning and evaluation process may also include a verifying phase. The verifying phase may involve determining whether the allowed orbital boundary created based on the sample continuous input provided by the user meets particular criteria. For example, the criteria may include a minimum diameter requirement so that if the user were to subsequently perform a continuous motion while remaining within the allowed orbital boundary, it would be distinguishable from a single touch. In some instances, the allowed orbital boundary may be an elliptical shape. In such instances, the criteria may include values such as a minimum diameter as well as a maximum allowed elliptical radii for height and width. These values may be calculated based on a centroid of the ellipse that forms the allowed orbital boundary. However, any number of other shapes, including freeform shapes, may form the allowed orbital boundary. If these criteria are not met, the learning phase may be repeated until an allowed orbital boundary of sufficient diameter is obtained.

Once the allowed orbital boundary is verified as meeting the criteria considered in the verification phase, one or more null spots may be established with respect to the allowed orbital boundary. A null spot may indicate a region where user input is not detected (e.g., a portion of the mobile device screen may not be able to detect a user's finger in a particular portion of the screen). A null spot may be detected where repeated, notable jumps in a path of the continuous input of the user are determined to exist. For example, the user may provide the continuous input and a certain point along the input may be undetected through every rotation. The user may be presented with a visualization of an input path created by the continuous input that indicates the location of the null spots. The user may be prompted as to whether they want to provide an alternative input, or use the current input path including the null spots. If the user chooses to use the current input path, the detection of the null spot may be ignored or debounced when future inputs are provided. Once the allowed orbital boundary has been established, the user may be able to provide a continuous input within the allowed orbital boundary in order to command the vehicle to perform the desired autonomous function. In addition to monitoring whether the user is performing the input within the allowed orbital boundary, and not crossing outside of the allowed orbital boundary, other additional criteria may also be monitored. One example of such criteria may be that the continuous input must be moving in a continuous clockwise or counterclockwise fashion. Thus, the user may not switch back and forth between clockwise and counterclockwise inputs. Another example of such criteria may include whether the continuous input is at or above a threshold rate of rotation. The rate of rotation may be defined as an angular velocity of the continuous input relative to a centroid of the shape formed by the input, and may be determined by taking one or more data points along the path of the input, and determining the length of time between each of the data points. If these additional criteria are not met, the vehicle may halt or cease to begin performing the autonomous function linked with the continuous input (e.g., self-parking).

The continuous input provided by the user may not remain within the allowed orbital boundary that was initially established by the learning and evaluation process if the allowed orbital boundary were to remain static. It may be the case that although the input shape itself is maintained and still provided within the optimal orbital boundaries, the center of the input shape, for example the centroid, may gradually drift to a position on the user interface of the mobile device that is ergonomically most convenient for the user (e.g., the continuous input may slowly drift from its initial location to another location on the user interface of the mobile device as is depicted in FIG. 6). This may lead to the continuous input eventually drifting to cross outside of the optimal orbital boundary. In some instances, reinforcement learning may be used to account for these slight drifts in the continuous input motion over time. Such reinforcement learning may involve active learning as opposed to the passive learning of the learning and evaluation process. This reinforcement learning may be used to train a verification system to dynamically establish new allowed orbital boundaries for the continuous input motion. In this regard, while a significant jump in the location of the continuous input would be registered as an invalid input, a more natural slight drift over time in the input would still be registerable as a valid input to provide some flexibility and allow the user to provide a command to the vehicle without having to remain perfectly within the allowed orbital boundary for the duration of the continuous input.

If the user fails to provide a continuous input motion that meets the allowed orbital boundary (the learned boundary), the input may either be debounced or detected as invalid. Additionally, feedback may be provided that the motion was not recognized or was otherwise invalid. If it is determined that the user continuously fails to operate (e.g., provide a continuous input) within the constraints of the allowed orbital boundary (e.g. five failures within a short span of time), the system may provide an indication to the user that the learning phase may be re-initiated.

Illustrative Embodiments

Figure 1:
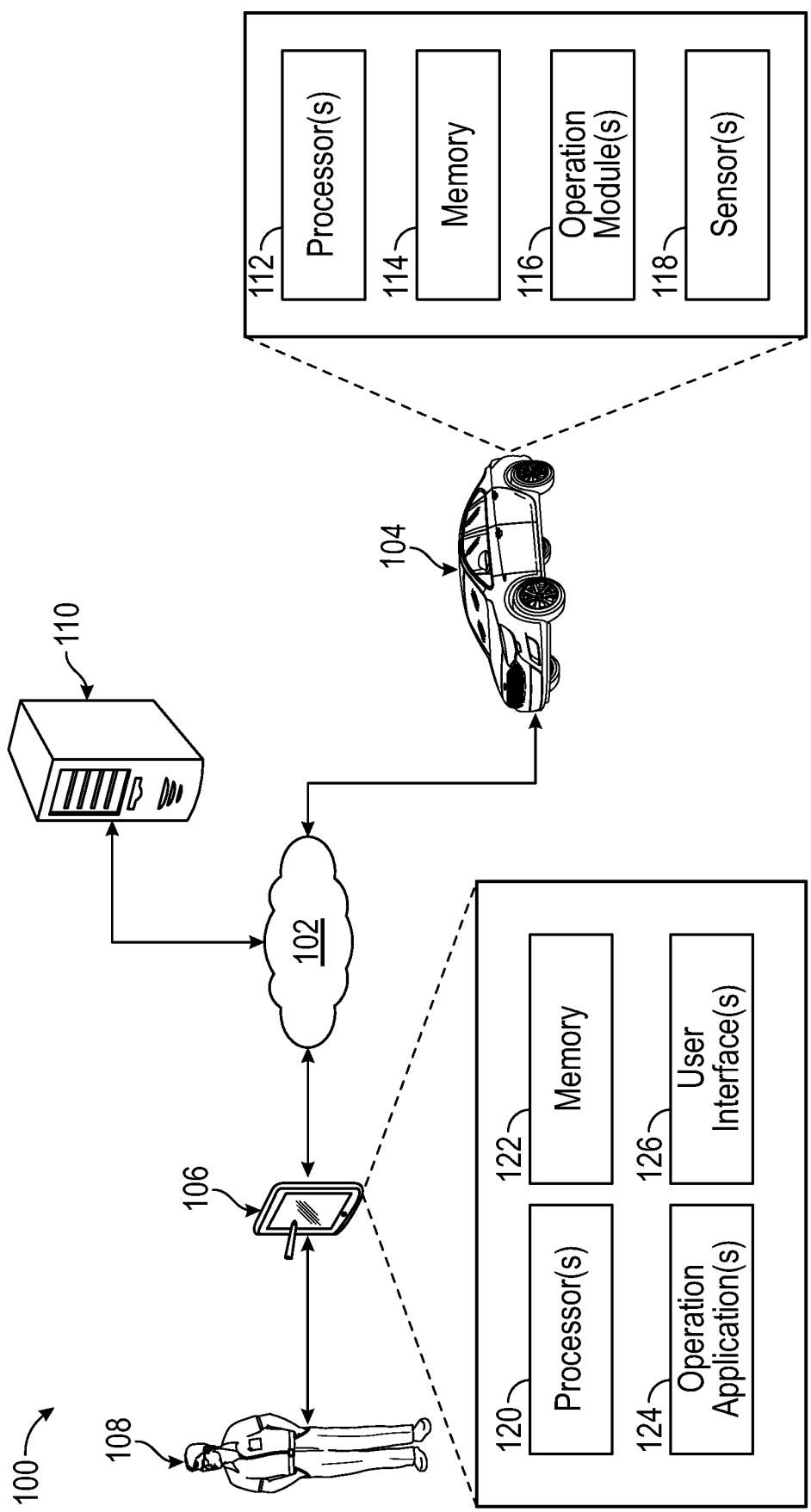
FIG. 1 depicts an illustrative architecture in accordance with one or more example embodiments of the disclosure.

Turning now to the drawings, FIG. 1 depicts an illustrative architecture 100 in which techniques and structures of the present disclosure may be implemented. The illustrative architecture 100 may include a communications network 102, a vehicle 104, a mobile device 106, which maybe operable by one or more users 108, and a server 110.

The communications network 102 may include any one or a combination of multiple different types of networks, such as cable networks, the Internet, wireless networks, and other private and/or public networks. In some instances, the communications network 104 may include cellular (e.g., 5G), Wi-Fi, or Wi-Fi direct.

The vehicle 104 may comprise at least one or more processor(s) 112, memory 114, one or more operation module(s) 116, and one or more sensor(s) 118. The functionality of the module(s) described herein (for example, the operation module(s) 116) may also be implemented as a single module or any other number of module(s).

The vehicle 104 may include one or more processors 112 that may include any suitable processing unit capable of accepting digital data as input, processing the input data based on stored computer-executable instructions, and generating output data. The computer-executable instructions may be stored, for example, in data storage and may include, among other things, operating system software and application software. The computer-executable instructions may be retrieved from the data storage and loaded into the memory 114 as needed for execution. The processor 112 may be configured to execute the computer-executable instructions to cause various operations to be performed. Each processor 112 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The operation module(s) 116 may perform operations including at least receiving, by a mobile device, a first input comprising a continuous motion associated with a first centroid. The operations may also include determining, based on the first input, an allowed orbital boundary. The operations may also include receiving a second input comprising a continuous motion associated with a second centroid. The operations may also include determining that the second centroid is in a different location than the first centroid. The operations may also include determining that the second input is within the allowed orbital boundary or within an allowed deviation of the allowed orbital boundary. The operations may also include adjusting, based on a location of the second centroid, the location of the allowed orbital boundary. The operation module(s) 116 may also perform any of the other operations described herein.

The operation module(s) 116 may perform operations including at least receiving, by a mobile device, a first input comprising a continuous motion associated with a first centroid. The operations may also include determining, based on the first input, an allowed orbital boundary. The operations may also receiving a second input comprising a continuous motion associated with a second centroid. The operations may also include determining that the second centroid is in a different location than the first centroid. The operations may also include determining that the second input is within the allowed orbital boundary or within an allowed deviation of the allowed orbital boundary. The operations may also include adjusting, based on a location of the second centroid, the location of the allowed orbital boundary. The operation module(s) 116 may also perform any of the other operations described herein.

The sensors 118 may include any sensors for capturing data in the environment of the vehicle 104, including, for example, audio sensors, video sensors, accelerometers, gyroscopes, temperature sensors, proximity sensors, LIDAR, etc. As an example, the sensors 118 may be used to assist the vehicle in performing functions such as Remote Park Assist (RePA) and Remote Autohitch (ReAH) based on a continuous input to the mobile device 106 by the user 108.

The mobile device 106 may comprise at least one or more processor(s) 120, memory 122, one or more operation module(s) 124, and a user interface 126. The processor(s) 120, memory 122, and operation application 124 may be the same as processor(s) 112, memory 114, and operation module 116.

The operation application 124 may be capable of performing any of the functions that operation module 116 is capable of performing. For example, operations described herein may be performed at the mobile device 106, at the vehicle 104, or at a combination of the mobile device 106 and/or the vehicle 104. Performing operation on the mobile device 106 may be desirable because the mobile device 106 may be able to perform processing based on received inputs faster than the vehicle. The functionality of the application(s) described herein (for example, the operation application(s) 124) may also be implemented as a single module or any other number of application(s).

The user interface 126 may allow a user 108 to interact with the mobile device 106 to perform certain actions through the operation application 124 of the mobile device 106. For example, the user interface 126 may be used by the user to provide the continuous input to the operation application 124, which may trigger the mobile device 106 to send commands to the vehicle 104 to perform autonomous functions, such as self-parking. The user interface 126 may also allow the operation application 124 to display any of the information, prompts, input areas, etc. associated with the operation application 124 (e.g., the user interface 126 may allow the operation application 124 to display the allowed orbital boundary on the mobile device 106).

The server 110 may serve as a remote cloud platform for performing any of the functionality described herein, such as the operations performed by the operation module 116 or operation application 124.

Figure 2:
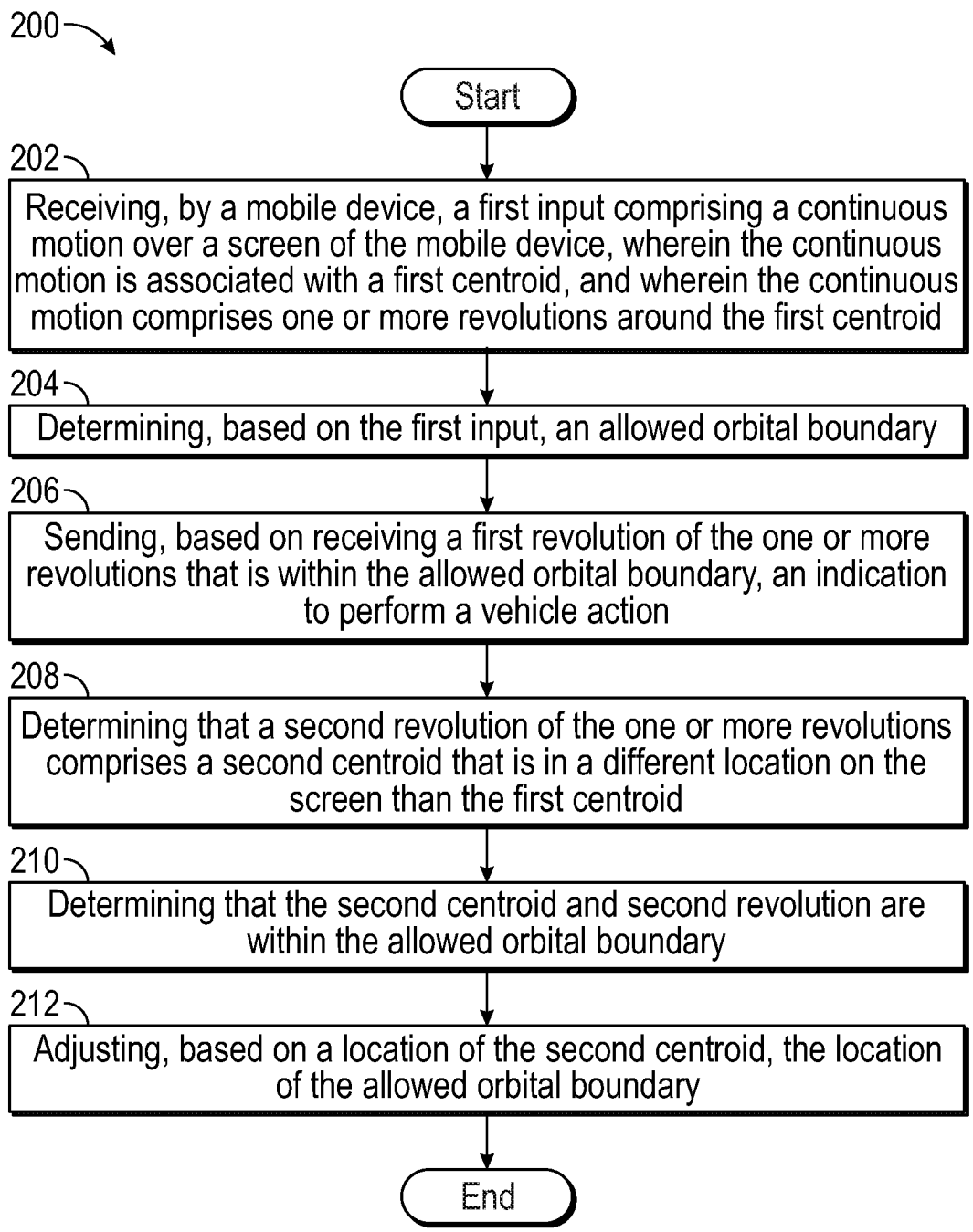
FIG. 2 depicts a flowchart of an example method in accordance with one or more example embodiments of the disclosure.

FIG. 2 is a flowchart of an example method of the present disclosure. The method may include an operation 202 of receiving, by a mobile device 106, a first input comprising a continuous motion associated with a first centroid. The first input may be a sample input as part of an initial learning phase to determine where the user 108 is most likely to provide a continuous input on the mobile device 106. The method may include an operation 204 of determining, based on the first input, an allowed orbital boundary. The allowed orbital boundary may include the initial region in which the user 108 is allowed to provide a continuous rotating input to trigger the vehicle to perform the autonomous function. The orbital boundary may be determined by the largest orbital path encapsulated by the user's motion while providing the sample continuous input. The method may include an operation 206 of receiving a second input comprising a continuous motion associated with a second centroid. The second input may, for example, represent the user 108 performing a continuous motion in order to command a vehicle to perform an action. The second continuous input may be provided after the allowed orbital region is established, so the user 108 is aware of the region in which they are allowed to provide an input in order for the command to be send to the vehicle.

The method may include an operation 208 of determining that the second centroid is in a different location than the first centroid. For example, the continuous input of the user may gradually drift across the mobile device 106 over time, and thus the centroid of the continuous input would follow the drift. The method may also include an operation 210 of determining that the second input is within the allowed orbital boundary or within an allowed deviation of the allowed orbital boundary. This operation may ensure that the drift of the continuous input is not too significant to ensure the input is still intended to be an input to trigger the autonomous function. The method may also include an operation 212 of adjusting, based on a location of the second centroid, the location of the allowed orbital boundary. This may permit the allowed orbital boundary to follow the drift of the continuous user input as long as the drift is gradual enough to remain in the allowed orbital boundary as the allowed orbital boundary slowly adjusts to the movement of the drift. The allowed orbital boundary thus may be flexible in allowing for some drift, but will not accept significant variations in input locations in a short period of time.

Figure 3:
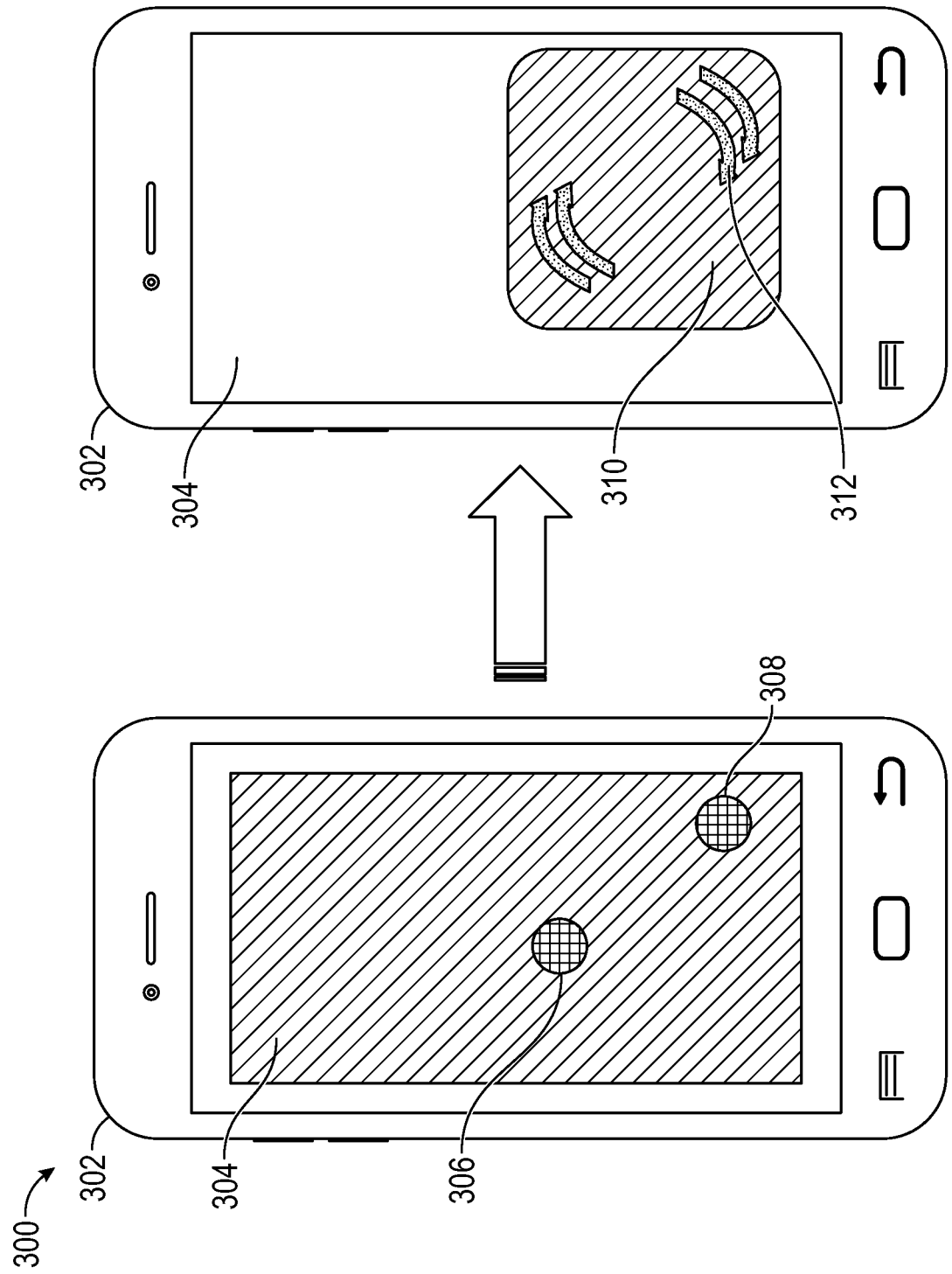
FIG. 3 depicts an example of a recommended input area in which to perform an orbital motion in accordance with one or more example embodiments of the disclosure.

FIG. 3 depicts an example of a process 300 for determining the area designated in a user interface 304 of a mobile device 302 (which may be user interface 126 and mobile device 106 respectively) to capture the initial sample continuous input provided by the user 108. For example, the process 300 may be used to determine the designated input area 404 described with reference to FIG. 4A. The process 300 may involve receiving one or more single touch inputs from the user 108 to determine the confines of the user interface 304 that the user 108 is most likely going to remain within when providing a continuous input. The single touch inputs may include a first input 306 representative of a furthest comfortable touch location for the user 108 and a second input 308 representative of a closest comfortable touch location for the user 108. For example, the furthest and closest comfortable touch locations may represent the closest and furthest areas of the user interface 304 that the user is able to reach with the finger they are using to interact with the user interface 304 while they are holding the mobile device 302. In some instances, the user 108 may be prompted by the mobile device 302 to provide the inputs. In some instances, the user 108 may simply provide the inputs without any prompt. Once the first input 306 and second input 308 have been received, a designated input area 310 (which may be the same as designated input area 404) may be provided on the user interface 304. In some instances, directional indicator lines 312 may also be provided that may serve to indicate to a user 108 a direction of continuous input to provide. This designated input area 310 may be used for example process 400 as described with reference to FIG. 4A.

FIG. 4A depicts an example process 400 for learning and evaluating input motions in order to establish an initial allowed orbital boundary in which the user 108 must remain to send commands to the vehicle 104 to perform an autonomous function. The example process 400 may be implemented on a mobile device 402, which may be the same as mobile device 106. The process 400 may begin with a learning phase 403, which may involve sampling a continuous motion input of the user 108 over a determined period of time or number of revolutions around a centroid. A user interface of the mobile device 402 may provide a designated input area 404 for the user to provide the sample continuous input. The user interface may also provide an indication of a desired path 406 (and/or direction) on which the user 108 should provide the continuous input sample. The user 108 may then proceed to provide a continuous input sample by following the desired path 406 for a period of continuous revolutions. Example process 400 may involve calibration to optimize reinforcement learning performance versus system hysteresis, where data inputs may be provided continuously at a period of 40 milliseconds (i.e. 10 samples would imply a learning delay of 400 milliseconds). In some instances, based on the continuous input sample, a reinforcement learning algorithm may establish an allowed orbital boundary 408. In some instances, the allowed orbital boundary 408 may be the largest orbital path that may be encapsulated in the user's motion. The allowed orbital boundary 408 may include a centroid 410 and a diameter 412. The centroid 410 may be defined as the geometric center of the allowed orbital boundary 408. Although an irregular shape is illustrated in FIG. 4A, the algorithm may also perform a shape fit calculation to output a symmetric shape such as an ellipse.

The process 400 may also include a verifying phase 407. The verifying phase 407 may involve determining whether the allowed orbital boundary 408 meets certain requirements, such as RePA requirements, for example. In some instances, the requirements may entail that the smallest diameter 412 of the allowed orbital boundary 408 may need to exceed a determined minimal threshold to ensure that a continuous input motion within the allowed orbital boundary 408 can be distinguished from a single press/touch in one location on the user interface of the mobile device. The requirements may also entail that the shape must be a closed orbital shape. Should the allowed orbital boundary 408 fail either one or both of these requirements, or any other relevant requirements, feedback may be provided to the user 108 and/or the user 108 may be required to repeat the learning phase 403. This feedback may indicate to the user 108 that they may need to adjust their touch input during the learning phase 403 to increase the minimum diameter 412 of the allowed orbital boundary 408 (for example, feedback may be provided to indicate to the user that they need to draw a larger circle or other defined or freeform shape through their continuous touch input).

The process 400 may also involve a defining phase 415. The defining phase 415 may involve establishing a region 414 outside of the allowed orbital boundary that may not be crossed by the user 108 when providing a touch input to the mobile device 402.

Figure 4B:
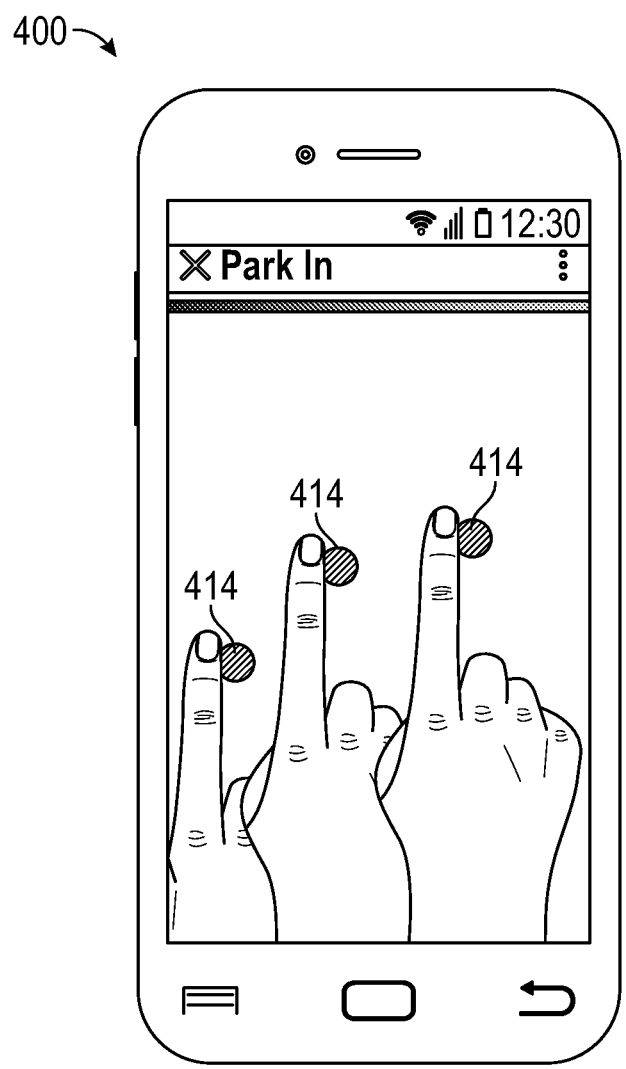
FIG. 4B depicts an example process for learning and evaluating input motions in accordance with one or more example embodiments of the disclosure.

FIG. 4B illustrates an embodiment of the region 414, which may simply represent a violation of the minimum radius requirement and may follow the finger movement around the screen to prevent a feature unlock or motion command when the user 108 makes a return motion that is too close to the outward motion. The region 414 may be displayed only below a threshold vehicle speed and/or at a particular phase of the RePA system operation in order to help acclimate the user 108 to the restrictions, while minimizing distraction during vehicle motion.

FIG. 5 illustrates a comparison 500 between a typical circular path and a more relaxed path geometry. As depicted in FIG. 5 the exemplary allowed orbital boundary regions of the mobile devices 502 may be more relaxed (e.g., freeform) in nature, as represented by the elliptic orbital boundary 504 compared to the more typical circular allowed orbital boundary region 505. The more relaxed path geometry 504 described herein may place more of an emphasis on factors such as the direction of motion 508 of the continuous user input, rather than the shape itself.

FIG. 6 depicts an example 600 of a dynamic adaptation to a drift in a continuous input provided by a user 108. As described herein, a user 108 may naturally drift the location of a continuous input they are providing to the user interface 601 of the mobile device 602 (which may be user interface 126 and mobile device 106 respectively). For example, a user 108 may be providing a continuous input with their thumb, and the thumb may gradually move to a more comfortable position on the user interface 601, where the more comfortable position may not be the same as the original position. When this occurs, the continuous input may still be accepted and commands to perform the autonomous vehicle function may still be sent regardless of this drift. This may happen through dynamic adaptation of the initial allowed orbital boundary. For example, the continuous input may begin at a first location 604 in a first allowed orbital boundary including a first centroid 605. Gradually over time, the continuous input may drift such that the continuous input is associated with a second centroid 606 at a second location 607. Consequentially, the allowed orbital boundary may be shifted slightly to account for the gradual drift.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
   a processor; and
   a memory storing computer-executable instructions, that when executed by the processor, cause the processor to:
   receive, by a mobile device, a first input comprising a continuous motion associated with a first centroid;
   determine, based on the first input, an allowed orbital boundary;
   receive a second input comprising a continuous motion associated with a second centroid;
   determine that the second centroid is in a different location than the first centroid;
   determine that the second input is within the allowed orbital boundary or within an allowed deviation of the allowed orbital boundary; and
   adjust, based on a location of the second centroid, the location of the allowed orbital boundary.

2. The system of claim 1, wherein the continuous motion associated with the first centroid or the continuous motion associated with the second centroid causes a vehicle action to be performed, wherein the vehicle action includes at least self-parking a vehicle.

3. The system of claim 2, wherein the computer-executable instructions further cause the processor to:
   determine that the first input fails to satisfy a criteria, wherein the criteria comprises at least one of the continuous motion of the first input not proceeding in a same clockwise or counterclockwise direction or a rate of rotation or the continuous motion associated with the first centroid or the continuous motion associated with the second centroid failing to exceed a first threshold rate; and
   send an indication to cease performance of the vehicle action.

4. The system of claim 2, wherein the computer-executable instructions further cause the processor to:
   determine that a third input fails to follow a path within the allowed orbital boundary; and
   send an indication to cease performance of the vehicle action.

5. The system of claim 4, wherein the computer-executable instructions further cause the processor to:
   determine that a fourth input fails to follow a path within the allowed orbital boundary; and
   send an indication that a re-learning process is required, wherein the re-learning process comprises receiving a third single touch input and a fourth single touch input.

6. The system of claim 2, wherein the vehicle action continues to be performed as long as the continuous motion of the first input is not ceased.

7. The system of claim 1, wherein the computer-executable instructions further cause the processor to:
   receive a first single touch input, wherein the first single touch input represents a furthest comfortable touch location for a user;
   receive a second single touch input, wherein the second single touch input represents a closest comfortable touch location for the user; and
   provide, based on the first single touch input and the second single touch input, a recommended area in which to perform the continuous motion associated with the first centroid or the continuous motion associated with the second centroid.

8. The system of claim 7, wherein the computer-executable instructions further cause the processor to:
   determine that the first input is within the recommended area; and
   determine that the allowed orbital boundary of the first input satisfies a threshold diameter.

9. The system of claim 1, wherein the computer-executable instructions further cause the processor to:
   determine a null spot associated with the allowed orbital boundary, wherein the null spot comprises an area within the allowed orbital boundary in which the first input is not detected.

10. A method comprising:
    receiving, by a mobile device, a first input comprising a continuous motion associated with a first centroid;
    determining, based on the first input, an allowed orbital boundary;
    receiving a second input comprising a continuous motion associated with a second centroid;
    determining that the second centroid is in a different location than the first centroid;
    determining that the second input is within the allowed orbital boundary or within an allowed deviation of the allowed orbital boundary; and
    adjusting, based on a location of the second centroid, the location of the allowed orbital boundary.

11. The method of claim 10, wherein the second input causes a vehicle action to be performed.

12. The method of claim 11, further comprising:
    determining that the first input fails to satisfy a criteria, wherein the criteria comprises at least one of: the continuous motion of the first input not proceeding in a same clockwise or counterclockwise direction or a rate of rotation of the continuous motion failing to exceed a first threshold rate; and
    send an indication to cease performance of the vehicle action.

13. The method of claim 11, further comprising:
    determining that a third input fails to follow a path within the allowed orbital boundary; and
    sending an indication to cease performance of the vehicle action.

14. The method of claim 13, further comprising:
    determining that a fourth input fails to follow a path within the allowed orbital boundary; and
    sending an indication that a re-learning process is required, wherein the re-learning process comprises receiving a third single touch input and a fourth single touch input.

15. The method of claim 11, wherein the vehicle action continues to be performed as long as the continuous motion of the first input is not ceased.

16. The method of claim 10, further comprising:
    receiving a first single touch input, wherein the first single touch input represents a furthest comfortable touch location for a user;
    receiving a second single touch input, wherein the second single touch input represents a closest comfortable touch location for the user; and
    providing, based on the first single touch input and the second single touch input, a recommended area in which to perform the continuous motion associated with the first centroid or the continuous motion associated with the second centroid.

17. The method of claim 16, further comprising:
    determining that the first input is within the recommended area; and
    determining that the allowed orbital boundary of the first input satisfies a threshold diameter.

18. The method of claim 10, further comprising:
    determining a null spot associated with the allowed orbital boundary, wherein the null spot comprises an area within the allowed orbital boundary in which the first input is not detected.

19. A system comprising:
    a processor; and
    a memory storing computer-executable instructions, that when executed by the processor, cause the processor to:
    receive, by a mobile device, a first single touch input comprising a closest comfortable touch location on a screen of the mobile device for a user;
    receive, by the mobile device, a second single touch input comprising a furthest comfortable touch location on a screen of the mobile device for a user;
    display, on the mobile device, an acceptable input region comprising boundaries including a location on the screen of the first single touch input and a location on the screen of the second single touch input;
    receive, by the mobile device, a first continuous input comprising a continuous motion in either a clockwise or counterclockwise direction, wherein the first continuous input is within the acceptable input region on the screen;
    determine, based on the first continuous input, an allowable orbital boundary comprising a first centroid;
    receive, by the mobile device, a second continuous input in either a clockwise or counterclockwise direction, wherein the second continuous input is within the allowable orbital boundary, and wherein the second continuous input comprises one or more revolutions about the first centroid;
    determine that a first revolution of the one or more revolutions of the second continuous input is provided in a single rotational direction and at a rate that exceeds a defined threshold rate;
    send, based on determining that the first revolution of the one or more revolutions of the second continuous input is provided in the single rotational direction and at the rate that exceeds the defined threshold rate, an indication to perform a vehicle action;

determine that a second revolution comprises a second centroid at a location that is different from the first centroid; and adjust, based on the determination that the second revolution comprises a second centroid at a location that is different from the first centroid, the location of the allowable orbital boundary.

20. The system of claim 19, wherein the vehicle action comprises self-parking a vehicle.

* * * * *